(12) United States Patent
Zhao

(10) Patent No.: US 10,228,276 B2
(45) Date of Patent: Mar. 12, 2019

(54) GLASS BODY SCALE

(71) Applicant: GUANGDONG ONE TWO THREE TECHNOLOGY CO., LTD., Zhongshan, Guangdong (CN)

(72) Inventor: Yang Zhao, Zhongshan (CN)

(73) Assignee: GUANGDONG ONE TWO THREE TECHNOLOGY CO., LTD., Zhongshan (CN)

( * ) Notice: Subject to any disclaimer, the term of this patent is extended or adjusted under 35 U.S.C. 154(b) by 95 days.

(21) Appl. No.: 15/363,467

(22) Filed: Nov. 29, 2016

(65) Prior Publication Data
US 2018/0149513 A1 May 31, 2018

(51) Int. Cl.
*G01G 21/22* (2006.01)
*G01G 21/23* (2006.01)
*G01G 19/44* (2006.01)

(52) U.S. Cl.
CPC ............. *G01G 19/44* (2013.01); *G01G 21/22* (2013.01); *G01G 21/23* (2013.01)

(58) Field of Classification Search
CPC .................................................. G01G 19/44
USPC ........................................................ 177/139
See application file for complete search history.

(56) References Cited

U.S. PATENT DOCUMENTS

| | | | | | |
|---|---|---|---|---|---|
| 3,741,324 | A | * | 6/1973 | Boshinski | G01G 19/4144 177/25.15 |
| 4,518,052 | A | * | 5/1985 | Chen | A61B 5/1072 177/245 |
| 4,664,207 | A | * | 5/1987 | Knothe | G01G 21/286 177/181 |
| 4,696,359 | A | * | 9/1987 | Glibbery | G01G 3/147 177/211 |
| 6,472,617 | B1 | * | 10/2002 | Montagnino | A61B 5/0537 177/126 |

FOREIGN PATENT DOCUMENTS

| | | | |
|---|---|---|---|
| CN | 201016799 | * | 2/2008 |
| CN | 201517946 | * | 6/2010 |
| CN | 202126553 | * | 1/2012 |
| CN | 205066913 U | | 3/2016 |

* cited by examiner

*Primary Examiner* — J M Saint Surin
(74) *Attorney, Agent, or Firm* — Oliff PLC

(57) ABSTRACT

The invention discloses a glass body scale, the scale comprising: a glass panel, where a support leg assembly is mounted beneath the glass panel, and a metering display component is mounted at one side of the glass panel; the glass panel is provided with a hole or holes, and a support leg of the support leg assembly is inserted into the hole or one hole, so that the glass panel is sleeved on the support leg by using the hole. The present invention has the advantages of simple structure, which results in convenient assemble, firmer installation, and implementation of an ultrathin appearance with thickness of less than 10 mm.

5 Claims, 4 Drawing Sheets

GLASS BODY SCALE

FIELD OF THE INVENTION

The present invention relates to a glass body scale, and, more specifically, it relates to an electronic glass body scale

RELATED ART OF THE INVENTION

With continuous improvement of living standards of people, many families use an electronic body scale. An electronic body scale is generally divided into a glass electronic body scale and a plastic electronic body scale. And a glass electronic body scale is more popular because it is low-cost, portable, fashionable and small.

However, in an existing glass electronic body scale, a support leg assembly below a glass plate uses a double-sided adhesive to affix the support leg assembly to underside of the glass plate, thus the support leg assembly easily falls off. In addition, an ultrathin appearance cannot be implemented.

SUMMARY OF THE INVENTION

An objective of the present invention is to overcome disadvantages of the prior art and to provide a glass body scale that has a simple structure, the glass body scale is stronger and durable, and an ultrathin appearance of the glass body scale can be implemented.

The objective of the present invention is implemented in such a way:

A glass body scale, comprising: a glass panel, where a support leg assembly is mounted beneath the glass panel, and a metering display component is mounted at one side of the glass panel; the glass panel is provided with a hole or holes, and a support leg of the support leg assembly is inserted into the hole or one hole.

In the glass body scale, the support leg assembly comprises four support legs; the support leg includes a support seat provided with a step; the step matches with the hole of the glass panel and the step can be inserted into the hole; the bottom of the support seat is provided with an opening, and the support seat is equipped with a sensor, a bottom cover, and a non-slip mat.

In the glass body scale, the metering display component comprising: a base plate, and a mainboard, a liquid crystal display, and an upper cover are located on the base plate.

In the glass body scale, the glass panel is provided with a protective film.

In the glass body scale, one side of the glass panel has a notch, making two sides of the notch to be an extension portion, the metering display component is installed at the notch, and the extension portion is mounted in the metering display component.

Beneficial effects of the present invention are:

In the present invention, a glass panel is provided with a hole or holes, and the support leg of the support leg assembly is made to be inserted into the hole or one hole of the glass panel correspondingly, so that the glass panel is sleeved on the support leg by using the hole. The present invention has the advantages of simple structure, which results in convenient assemble, firmer installation, and implementation of an ultrathin appearance with thickness of less than 10 mm.

DETAILED DESCRIPTION

Figure 1:
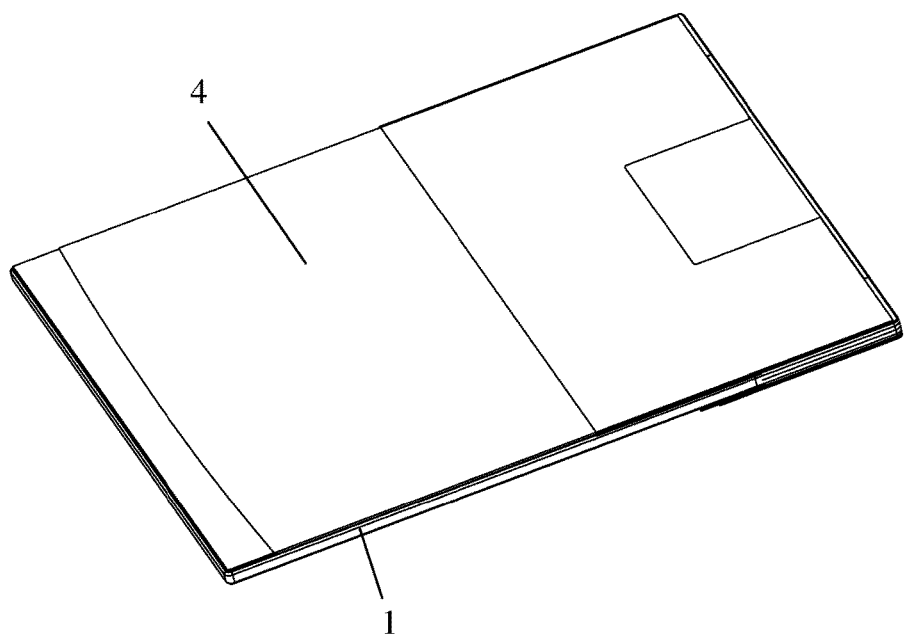
FIG. 1 is a space diagram according to the present invention.
Figure 2:
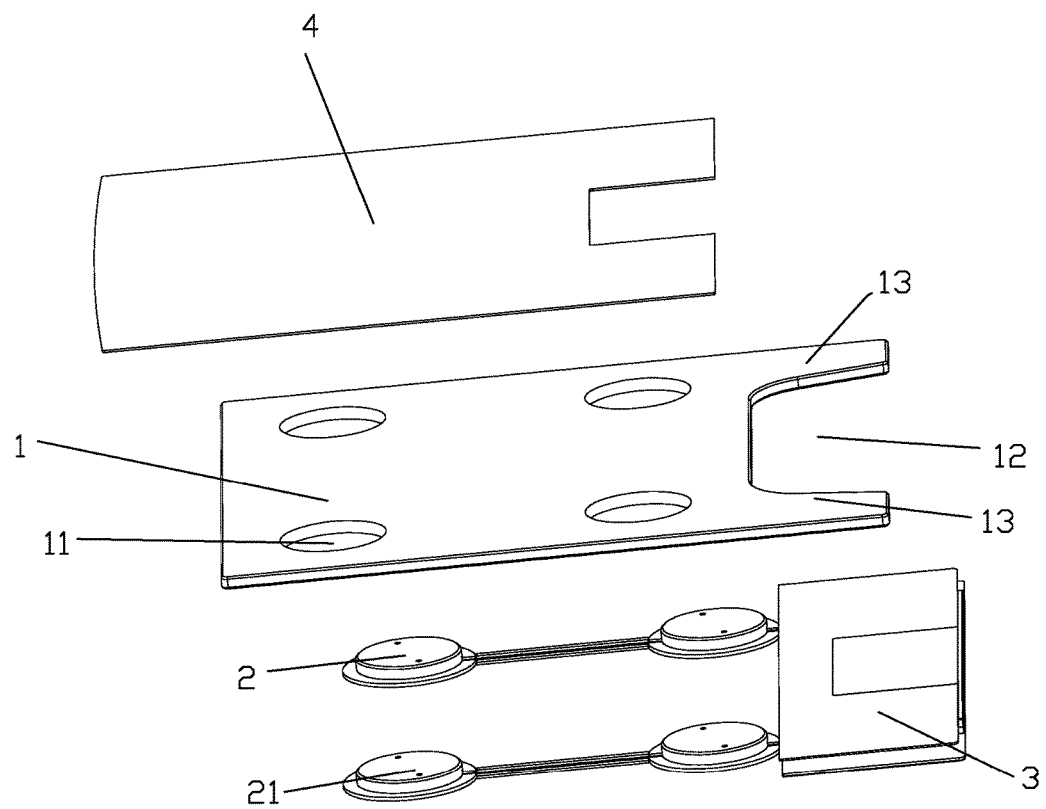
FIG. 2 is an explosion diagram according to the present invention.
Figure 3:
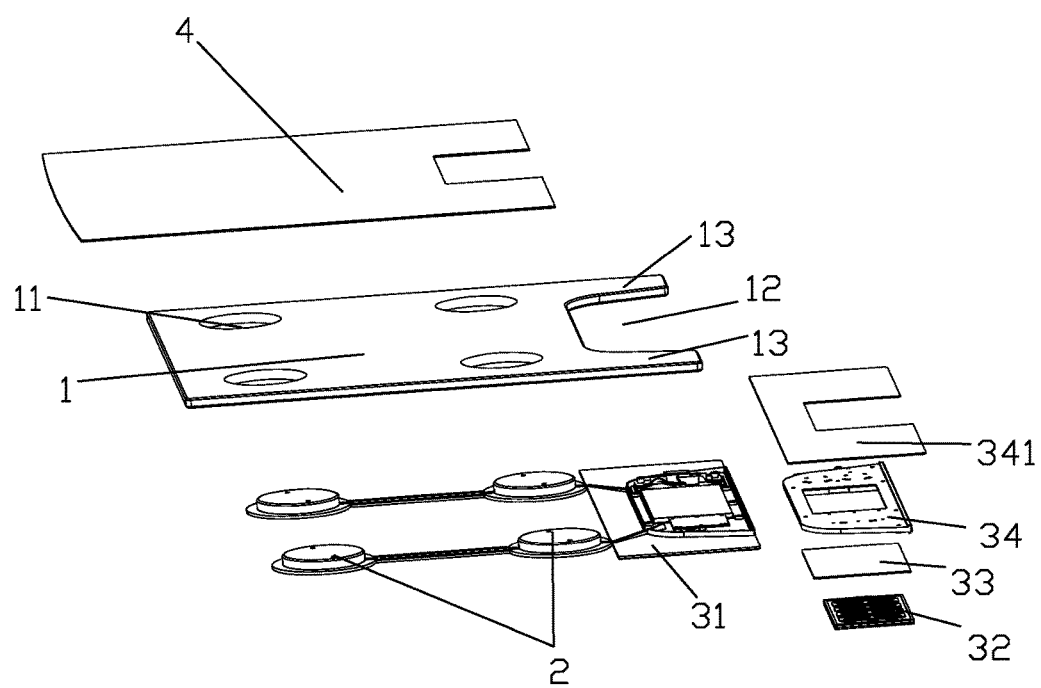
FIG. 3 is an another explosion diagram according to the present invention.
Figure 4:
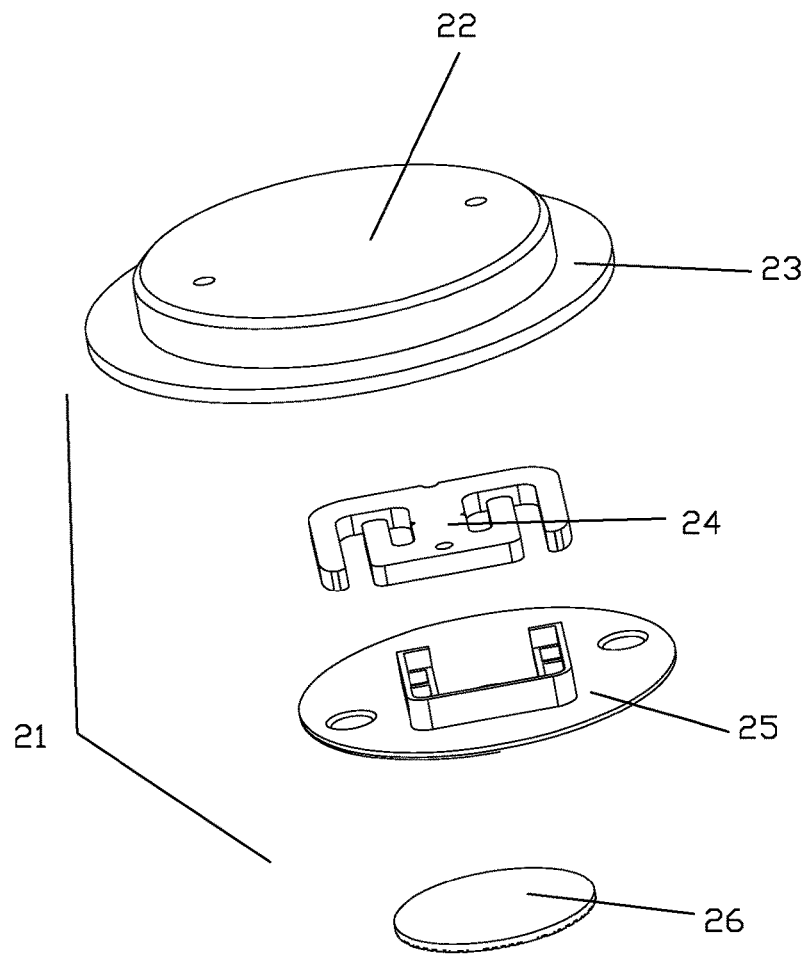
FIG. 4 is a structural diagram of a support leg according to the present invention.

The present invention is further described below with reference to accompanying drawings:

A glass body scale comprising: a glass panel 1, where a support leg assembly 2 is mounted beneath the glass panel 1, and a metering display component 3 is mounted at one side of the glass panel 1; the glass panel 1 is provided with a hole or holes 11, a support leg of the support leg assembly 2 is inserted into the hole 11 or one hole 11, and the glass panel 1 is provided with a protective film 4. The glass panel 1 is provided with the hole 11, and the support leg of the support leg assembly 2 is made to be inserted into the hole 11 of the glass panel 1, so that the glass body scale has a long service life with easy assembly and securer installation.

The support leg assembly 2 of the present invention may comprise four support legs 21 or may comprise six support legs 21. Four support legs 21 are located symmetrically and connected in pairs, the four support legs 21 are connected with the metering display component 3. The support leg 21 comprising: a support seat 23 provided with a step 22. The step 22 matches with the hole 11 on the glass panel 1 and the step 22 can be inserted into the hole 11. The bottom of the support seat 23 is provided with an opening, and the support seat 23 is equipped with a sensor 24, a bottom cover 25, and a non-slip mat 26.

The metering display component 3 of the present invention comprises a base plate 31, and a mainboard 32, a liquid crystal display 33, and an upper cover 34 are located on the base plate 31. The upper cover 34 may be provided with an upper cover protective film 341 furtherly.

In the present invention, one side of the glass panel 1 has a notch 12, so that two sides of the notch 12 are formed an extension portion 13, the metering display component 3 is installed at the notch 12, and the extension portion 13 is mounted in the metering display component 3, the extension portion 13 is preferably mounted between the base plate 31 and the upper cover 34, and more preferably, fixed by screw.

The invention claimed is:
1. A glass body scale, comprising:
   a glass panel provided with at least one hole;
   a support leg assembly mounted beneath the glass panel and comprising a support leg that is inserted into the hole; and
   a metering display component that is mounted at one side of the glass panel.
2. The scale according to claim 1, wherein:
   the glass panel comprises a plurality of holes;
   the support leg assembly comprises four support legs;
   each of the support legs includes a support seat provided with a step;
   each of the steps is inserted into a corresponding one of the holes;
   the bottom of each support seat is provided with an opening; and
   each support seat is equipped with a sensor, a bottom cover, and a non-slip mat.
3. The scale according to claim 1, wherein the metering display component comprises:

a base plate, and a mainboard, a liquid crystal display, and an upper cover that are located on the base plate.

4. The scale according to claim 1, wherein the glass panel is provided with a protective film.

5. The scale according to claim 1, wherein:
one side of the glass panel has a notch and two extension portions on opposing sides of the notch; and
the metering display component is installed at the notch, and the extension portions are mounted in the metering display component.

* * * * *